Nov. 26, 1963  R. S. JOHNSON ETAL  3,111,937
INTAKE MANIFOLD CONSTRUCTION FOR COMPRESSION IGNITION
TYPE INTERNAL COMBUSTION ENGINES
Filed Oct. 17, 1961  3 Sheets-Sheet 1

Inventors:
Richard S. Johnson
Richard J. Brehm
Atty.

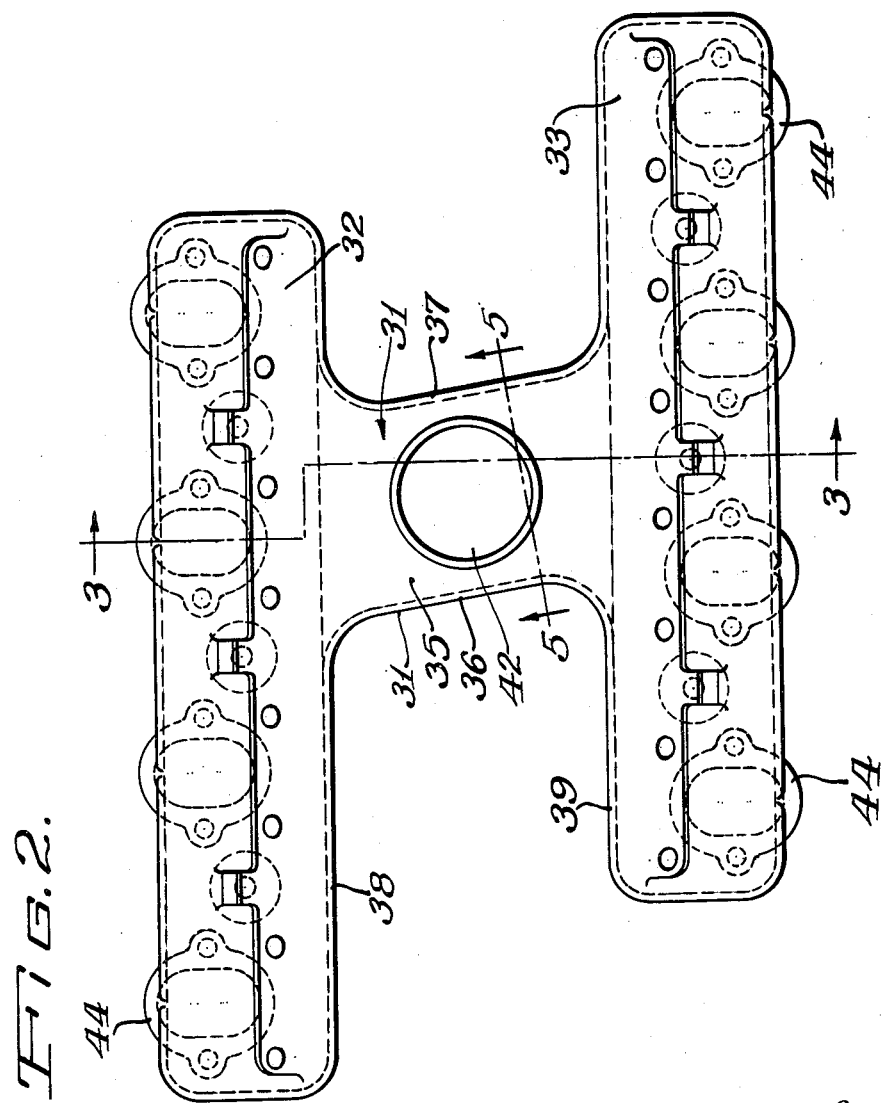

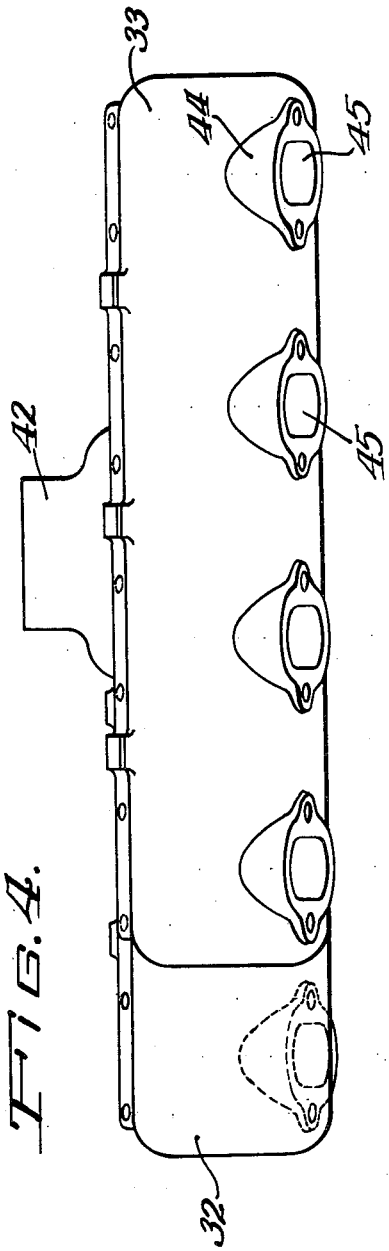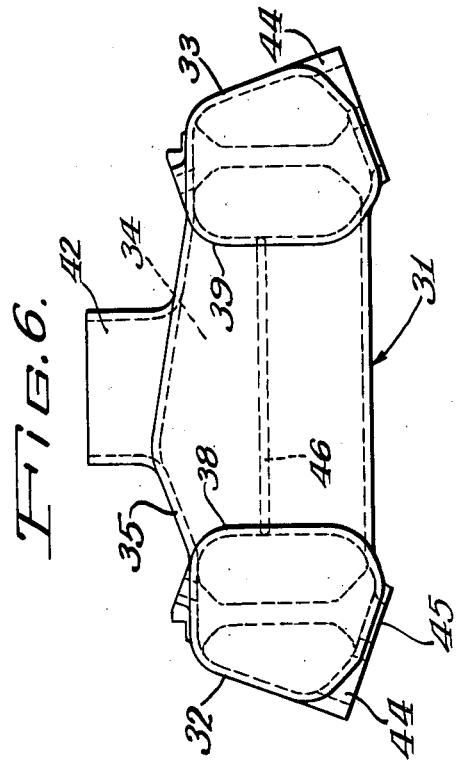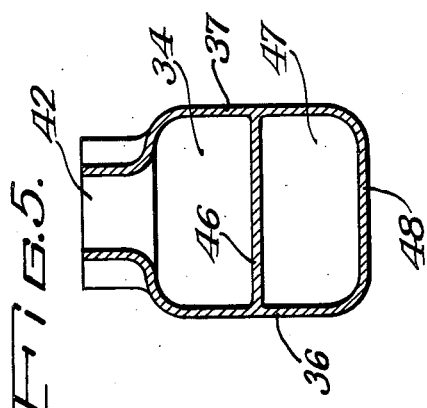
Inventors:
Richard S. Johnson
Richard J. Brehm
Paul O. Pippel
Atty.

United States Patent Office

3,111,937
Patented Nov. 26, 1963

3,111,937
INTAKE MANIFOLD CONSTRUCTION FOR COMPRESSION IGNITION TYPE INTERNAL COMBUSTION ENGINES
Richard S. Johnson and Richard J. Brehm, Fort Wayne, Ind., assignors to International Harvester Company, Chicago, Ill., a corporation of New Jersey
Filed Oct. 17, 1961, Ser. No. 145,705
9 Claims. (Cl. 123—55)

This invention relates to an intake manifold construction for compression-ignition type internal combustion engines and, more particularly, to a new and improved intake manifold for distributing air to the cylinders of a multi-cylinder, compression-ignition type engine.

It is a well established fact that the maximum power obtainable from an engine is dependent upon the volumetric efficiency of the engine. As a result, designers of compression ignition, piston type engines have strived to increase the volumetric efficiency by improving the air induction system used with such engines. One of the most effective methods to achieve an efficient air induction system for compression-ignition type internal combustion engines is to minimize the differences in weight of air distributed to each cylinder during its suction stroke and to charge each of the cylinders with air to its maximum capacity. One factor which greatly influences the weight of air delivered to any particular cylinder during its suction stroke and, hence, the differences in weight of air distributed to the cylinders, is the magnitude and direction of the dynamic pressure waves created in the intake manifold by the pistons reciprocating in their respective cylinders during operation of the engine. While the problem is present in all forms of piston type internal combustion engines, solution to the problem of minimizing the differences in weight of air distributed to each of the cylinders of a V-type internal combustion engine is more difficult. Inasmuch as in a V-type engine one-half of the cylinders are generally longitudinally disposed within a cylinder bank which is angularly arranged with respect to the other bank having the remaining cylinders longitudinally disposed therein and because of the usual firing orders for V-type internal combustion engines with a two plane crankshaft which always results in a pair of adjacent cylinders firing 90° apart with respect to each other, dynamic pressure waves are present in the intake manifold which produce velocities and eddies which are detrimental to the proper flow of air to the cylinders. The result is that the cylinders are not filled to their maximum capacity nor do they receive an equal weight of air and, consequently, the engine efficiency is adversely affected. It is, therefore, an important object of the present invention to provide an air induction manifold for a V-type, piston internal combustion engine wherein the dynamic pressure waves in the manifold are reduced considerably than heretofore possible in order to minimize the differences in weight of air distributed to each cylinder and to increase the weight of air delivered to each cylinder during its suction stroke.

Still another object is to provide a device for the introduction of air into the intake ports of a multiple cylinder diesel engine which is simple and inexpensive to manufacture and is sturdy in construction.

A still further object of the invention is to provide an air induction manifold embodying a pressure wave channel connecting the two cylinder banks of a V-type internal combustion engine which is separate from and distinct from an air inlet or air-receiving plenum chamber with the result that a high volumetric efficiency and substantially uniform charging of all of the engine cylinders is insured by reducing air flow turbulence.

A more specific object is to provide an air induction manifold for a V-type internal combustion engine which includes a plenum chamber of relatively large volume adapted to draw air from the atmosphere, a pressure wave chamber or channel directly below the air inlet or receiving plenum chamber and a pair of spaced and parallel runner passages, each of which is in air communication with the inlet ports of a respective cylinder head of one of the engine banks and is also in air flow communication with the air inlet plenum chamber and the pressure wave plenum chamber or channel whereby the energy losses due to the reversals of air flow and high air turbulence in the manifold during operation of the engine are reduced to a minimum.

The foregoing and other important objects and desirable features inherent in and encompassed by the invention together with many of the purposes and uses thereof will become readily apparent from a reading of the ensuing description in conjunction with the annexed drawings, in which:

FIGURE 2 is a top plan view of the air induction manifold disconnected from the engine;

FIGURE 4 is a side elevational view of the air induction manifold shown in FIGURE 2;

FIGURE 5 is a sectional view taken substantially along line 5—5 of FIGURE 2; and FIGURE 6 is an end elevational view of the air induction manifold shown in FIGURE 2.

Figure 1:
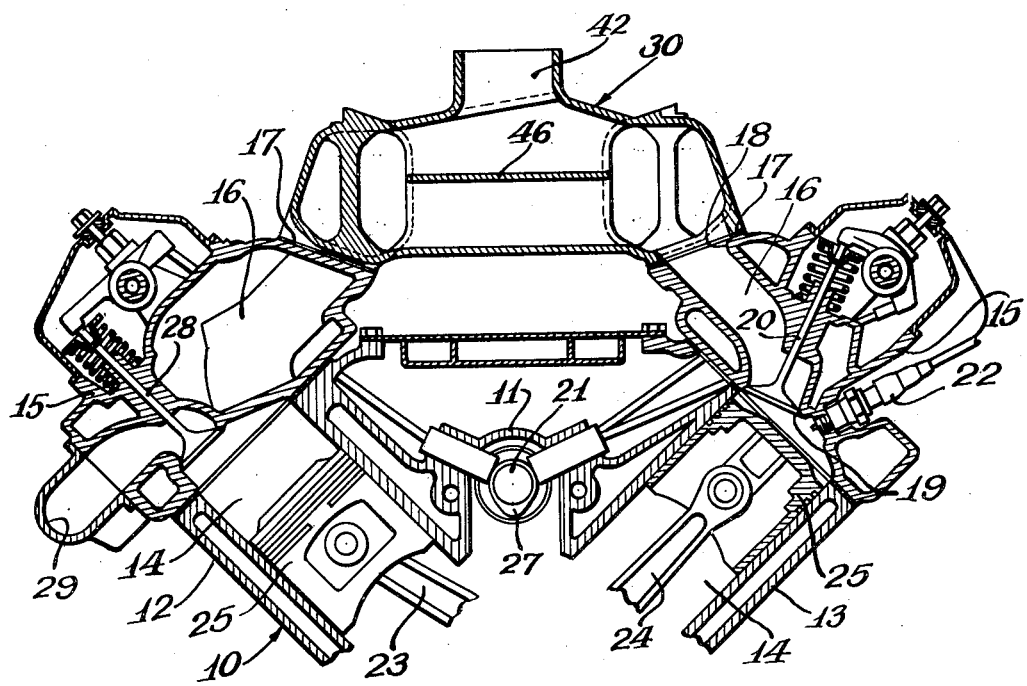
FIGURE 1 is a transverse vertical section taken on a line extending through the cylinders in opposite banks of a V-8 engine having the invention incorporated therein.

Referring to the drawings in detail wherein like reference characters represent like elements throughout the various views. A piston type internal combustion engine is designated generally by numeral 10. The engine 10 is of the so-called V-type and includes a cylinder block 11 formed to provide a pair of angularly disposed, longitudinally extending banks 12, 13 of cylinders 14. A cylinder head 15 is rigidly secured to the uppermost surface of each bank 12, 13 of cylinders and each cylinder head 15 is provided with a plurality of longitudinally spaced cavities each of which is registerable with the open end of a respective cylinder 14. Each cylinder head 15 is provided with a plurality of air intake passages 16, each of which extends generally upwardly and inwardly from a respective cylinder 14 and opens into the uppermost face 17 of a respective cylinder head 15. The uppermost faces 17 of the cylinder heads 15 are slightly inclined and extend longitudinally with respect to the longitudinal axis of the engine 10 and the outer ends of the intake passages 16 where they open into the faces 17 define longitudinally spaced intake ports 18. The inner ends of the intake passages 16 are defined by valve seat 19. Air flow through the intake passages 16 to the cylinders 14 is controlled by intake valves 20, each of which is adapted to engage a respective valve seat 19 to prevent air flow through the intake passage 16 associated therewith and alternately to move away from the valve seat and permit the cylinder 14 to be charged with air. The intake valves 20 are actuated by a longitudinally extending engine camshaft 21 rotatably supported in the apex of the cylinder banks 12, 13. Fuel for mixing with the charge of air received in each cylinder 14 to provide a combustible mixture is supplied through a fuel injection nozzle 22. The fuel injection nozzles 22 are part of a conventional fuel injection system of the type which is responsive to the fuel demands of the engine 10 and is effective to inject metered quantities of fuel from the nozzles 22 and into the air charge to obtain a combustible mixture of air and fuel in a desired proportion.

In the type of engine 10 illustrated, the cylinder banks 12, 13 are slightly offset in a longitudinal direction with respect to each other so that the connecting rods 23, 24 in opposite cylinders 14 may be journaled on a single crank throw of the crankshaft (not shown) in a side-by-side relation. Each connecting rod 23, 24 carries a piston 25 for driving the crankshaft, which shaft, in turn, is operatively connected to the cam shaft 21 for rotating the same. The cam shaft 21 has a plurality of cam lobes 27 thereon, each of which is adapted to actuate a respective intake valve 20 or a respective exhaust valve 28. Each cylinder 14 is provided with an exhaust valve 28 for controlling the flow of exhaust gases from the cylinder 14 associated therewith to one of a pair of exhaust manifolds 29 which are secured to the outboard sides of cylinder heads 15. Only one exhaust manifold 29 is shown in the drawings. The foregoing engine structure description is considered conventional and the engine structure, per se, forms no part of the present invention.

Figure 3:
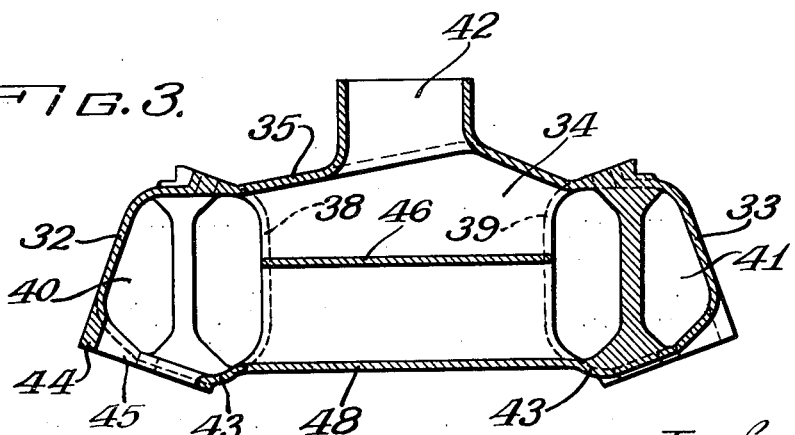
FIGURE 3 is a sectional view taken substantially along line 3—3 of FIGURE 2.

The air induction system of the present invention includes an air induction or intake manifold 30 having a central main body 31 and a pair of transversely spaced, longitudinally extending runners 32, 33, all of which are integrally formed. As best shown in FIGURE 2, the manifold 30 is substantially H-shaped in plan and the runners 32 and 33 are parallel with respect to each other and are offset slightly in a longitudinal direction. The main body 31 of the air induction manifold 30, which is generally rectangular in shape, as viewed in FIGURE 2, is spaced substantially midway between the upper ends of the cylinder banks 12 and 13 and between the longitudinally spaced ends of the banks 12 and 13 when assembled on the engine 10. The vertically extending, cylindrical members disposed within the runners 32, 33 and shown in FIGURES 3 and 6 are provided for mechanically strengthening the air induction manifold 30. It is to be understood that such cylindrical members could be eliminated from the manifold structure without departing from the spirit and scope of the invention. The main body 31 is formed with an enlarged air-receiving or inlet plenum chamber 34, the top wall of which is defined by the uppermost wall 35 of the main body 31. The uppermost wall 35 is generally horizontally disposed and extends between the runners 32 and 33. The central main body 31 also includes longitudinally spaced, substantially vertical end walls 36, 37 which partially define the longitudinal limits of the air-receiving plenum chamber 34. The volume of the plenum chamber 34 is relatively large in comparison with the piston displacement of the engine 10. The transversely spaced ends of the air-receiving plenum chamber 34 open into the inwardly facing, substantially vertical walls 38, 39 of the runners 32, 33 respectively. The runners 32, 33 define longitudinally extending runner passages 40, 41, respectively, which are substantially rectangular in vertical section as shown in FIGURE 3.

The uppermost wall 35 of the central main body 31 is provided with an inlet opening 42 which is adapted to receive air from the atmosphere. It is to be understood that the inlet opening 42 could be formed in either of the vertical end walls 36, 37 without departing from the spirit and scope of the invention. Air entering the inlet opening 42 passes through suitable filtering means (not shown) whereby only clean filtered air is permitted to flow to the air-receiving plenum chamber 34. The lowermost wall 43 of each runner 32, 33 is provided with a plurality of flanged air outlets 44 which are slightly inclined to conform to the inclination of the faces 17 and secured to the cylinder head uppermost faces 17 by any suitable means such as bolts or the like so that the outlet openings 45 formed by the flanged outlets 44 will register with the intake ports 18 in the cylinder heads 15.

A generally horizontal partition or wall 46 extends between and is integrally formed with the vertical end walls 36, 37 of the central main body 31. The partition 46 divides the interior space of the main body 31 into two plenum chambers, one of them being the air-receiving plenum chamber 34 and the other chamber 47 directly below the air-receiving plenum chamber being a pressure wave chamber or channel 47. The bottom wall 48 of the main body 31 defines the lower limit of the pressure wave chamber 47 and the partition 46 serves as a common wall for the pressure wave chamber 47 and the air-receiving plenum chamber 34. The transversely spaced ends of the pressure wave chamber 47, like the transversely spaced ends of the air-receiving plenum chamber 34, open into the inwardly facing substantially vertical walls 38, 39 of the runners 32, 33 respectively. The volume of the pressure wave plenum chamber 47, like the plenum chamber 34 is relatively large in comparison with the piston displacement of each cylinder 14. From the foregoing, it will be appreciated that both runner passageways 40, 41 are in direct air communication with the air-receiving plenum chamber 34 and the pressure wave chamber 47.

In the operation of a conventional type internal combustion engine having the usual 90 degrees between crankpins in a two plane arrangement, a pair of adjacent cylinders always fire 90 degrees apart with respect to each other. Assuming the firing order of the engine shown in FIGURE 1 is 1-8-4-3-6-5-7-2 and further assuming that the cylinders in the left bank 12 are numbered 1, 3, 5 and 7 from the normally forward end of the engine and similarly the cylinders in the right bank 13 are numbered 2, 4, 6 and 8 from the same engine end, one complete firing cycle of the engine is as follows:

The demand cylinder pressure wave or suction impulse is first created in the runner passageway 40 and manifold outlet opening 45 for cylinder No. 1. Next the demand cylinder pressure wave is created in the runner passageway 41 and manifold outlet opening 45 for cylinder No. 8 followed by suction in the same runner passageway 41 and outlet opening 45 for cylinder No. 4. Next suction is created in the runner passageway 40 transversely spaced from the runner passageway 41 and the outlet opening 45 for cylinder No. 3 followed by suction impulse in the runner passageway 41 and outlet opening for cylinder No. 6. Thereupon, the demand cylinder pressure wave next flows in passageway 40 and outlet opening 45 to cylinder No. 5 followed by suction in the same passageway 40 and the outlet opening 45 for cylinder No. 7. Then suction is next created in runner passageway 41 and outlet opening for cylinder No. 2 which completes one firing cycle of the engine and at the start of the next firing cycle the demand cylinder pressure wave again flows in runner passageway 40 in the direction of the manifold outlet opening 45 to cylinder No. 1.

From the foregoing it will be appreciated that with a 90 degree crankpin arrangement and a firing order as noted above, the suction impulse pressure wave during one firing cycle flows from cylinder No. 1 and the runner passageway 40 to cylinder No. 8 and the runner passageway 41 through the pressure wave chamber 47. The pressure wave also flows transversely through the pressure wave chamber 47 between the firing of cylinders 4 and 3. The pressure wave again reverses direction between passageways 40, 41 when the demand cylinder pressure wave or suction impulse is created in passageway 41 and outlet opening for cylinder No. 6 after cylinder No. 3 has fired. In a similar manner the pressure wave flows transversely through the pressure wave chamber 47 between the firing of cylinders 6 and 5, 7 and 2, and 2 and 1. Hence, the suction impulse or pressure wave alternates in direction from one runner passageway to the other six times during the complete firing cycle of the engine and always passes through the pressure wave chamber 47 when alternating. It will be appreciated that the demand pressure wave as it flows between the runner passageways 40 and 41 flows substantially horizontally. However, by making the volume of the plenum chambers relatively large in relation to the volume of air demanded by each cylinder 14 during the firing cycle of the engine, very little air is drawn from one runner passageway to the other and, consequently, the velocity of the pressure wave flowing through the pressure wave chamber 47 is reduced to a relatively low value. However, during the firing cycle of the engine clean filtered air must be continually drawn through the manifold inlet opening 42 to replenish the air being used in the combustion process. The direction of the air flowing into the plenum chamber 34 is substantially at right angles to the pressure wave flowing generally transversely horizontally through the pressure wave plenum chamber 47 as it alternates direction between the runner passageways 40, 41. Because of the partition 46, the air flowing into the plenum chamber 34 does not join the pressure wave flowing through the pressure wave plenum chamber 47 at right angles but rather meets such pressure wave at either of the openings in the vertical walls 38, 39 of the runners 32, 33, depending on which cylinder 14 is starting its suction stroke, and is flowing generally horizontally, transversely in the same direction as the pressure wave flowing through the plenum chamber 47. Thus, the energy losses which would result if the two air streams met at right angles are reduced to a minimum. Furthermore, since the volume of the plenum chambers 34 and 47 is relatively large in comparison to the volumetric capacity of each cylinder 14, the velocity of the pressure wave flowing through the plenum chamber 47 from one runner passageway to the other is reduced to the lowest possible value. Hence, the differences in weight of air distributed to each cylinder 14 is minimized by lowering the velocity of the demand pressure wave flowing through the chamber 47 and by reducing energy losses in the air streams.

The embodiment of the invention chosen for the purposes of illustration and description herein is that preferred for achieving the objects of the invention and developing the utility thereof in the most desirable manner, due regard being had to existing factors in economy, simplicity of design and construction, production methods and the improvements sought to be effected. It will be appreciated therefore that the particular structural and functional aspects emphasized herein are not intended to exclude, but rather to suggest, such other adaptations and modifications of the invention as fall within the spirit and scope of the invention as defined in the appended claims.

What is claimed is:

1. An air induction system for a piston engine of the V-type having a pair of angularly related banks of cylinders, comprising, a pair of plenum chambers; an air inlet to one of said chambers; a pair of elongated runner passageways, each of said runner passageways being partially defined by a wall section, each of said wall sections defining respective ends of said plenum chambers, each of said passageways being in air communication with the cylinders of a respective bank of cylinders and each of said wall sections having an opening therein to provide air communication between each of said passageways and said plenum chambers, said plenum chambers being in air communication with each other only through said runner passageways.

2. An air induction system for a piston engine of the V-type having a pair of angularly related banks of cylinders, comprising, a pair of plenum chambers having a common dividing wall; an air inlet to one of said chambers; a pair of spaced and parallel elongated runner passageways, each of said runner passageways being partially defined by a wall section, each of said wall sections defining respective ends of said plenum chambers and a respective edge of said common dividing wall, each of said runner passageways being in air communication with the cylinders of a respective bank and each of said wall sections having an opening therein to provide air communication between each of said passageways and said plenum chambers, said plenum chambers being in air communication with each other only through said runner passageways.

3. An air induction system for a piston engine of the V-type having a pair of angularly related banks of cylinders, comprising, a pair of plenum chambers arranged one above the other and having a common dividing wall; an air inlet to one of said chambers; a pair of elongated runner passageways, each of said passageways being in air communication with the cylinders of a respective bank and said plenum chambers, said plenum chambers being in air communication with each other only through said runner passageways.

4. An air induction system for a piston type engine of the V-type having a pair of angularly oriented banks of cylinders, comprising, a pair of plenum chambers transversely spaced substantially midway between said banks, said plenum chambers being arranged one above the other and having a common dividing wall; an air inlet to the uppermost of said chambers; a pair of elongated runner passageways, each of said passageways being in air communication with the cylinders of a respective bank and said plenum chambers said plenum chambers being in air communication with each other only through said runner passageways.

5. An air induction system for a piston engine of the V-type having a pair of angularly oriented longitudinally extending banks of cylinders, comprising, a hollow body transversely spaced substantially midway between the upper ends of said banks; a partition in said body dividing the space enclosed by said body into an air-receiving plenum chamber and a pressure wave plenum chamber; an air inlet for said air-receiving plenum chamber; and a pair of longitudinally extending transversely spaced and parallel runners, each of said runners including a vertical wall section and defining a runner passageway, each of said vertical wall sections defining respective ends of said plenum chambers and a respective edge of said partition, each of said vertical wall sections having an opening therein to provide an air communication between each of said passageways and said air-receiving and pressure wave plenum chambers and the cylinders of a respective bank said plenum chambers being in air communication with each other only through said runner passageways.

6. An air induction system for a piston engine of the V-type having a pair of longitudinally extending angularly oriented banks of cylinders, comprising, a hollow body transversely spaced substantially midway between the upper ends of said banks of cylinders; a generally horizontally disposed partition in said body dividing the space enclosed by said body into an air-receiving plenum chamber and a pressure wave plenum chamber; an air inlet for said air-receiving plenum chamber; a pair of longitudinally extending transversely spaced runners, each of said runners defining a runner passageway, each of said runner passageways being in air communication with said air-receiving and pressure wave plenum chambers and the cylinders of a respective bank.

7. An air induction system for a piston engine of the V-type having two longitudinally extending, angularly oriented banks of cylinders, comprising, a hollow body spaced transversely substantially midway between the upper ends of said banks, said body being substantially rectangularly shaped in plan; a substantially horizontally disposed partition in said body dividing the space enclosed by said body into an upper air-receiving plenum chamber and a lower pressure wave plenum chamber; an air inlet for said air-receiving chamber; and a pair of longitudinally extending, transversely spaced and parallel runners integrally formed with said body, each of said runners defining a runner passageway, each of said runner passageways being in air communication with the cylinders of a respective bank; and means for providing air communication between each of said runner passageways and said air-receiving and pressure wave plenum chambers.

8. An air induction system for a piston engine of the V-type having two longitudinally extending, angularly oriented banks of cylinders, comprising, a hollow body spaced transversely substantially midway between the upper ends of said banks, said body being substantially rectangularly shaped in plan and having vertically spaced upper and lower walls, the transversely spaced ends of said body being open; a substantially horizontally disposed partition in said body vertically spaced between said upper and lower walls of said body dividing the space enclosed by said body into an upper air-receiving plenum chamber and a lower pressure wave plenum chamber; an air inlet in said upper wall for supplying said air-receiving chamber with air; and a pair of longitudinally extending transversely spaced and parallel runners integrally formed with said body, each of said runners including a vertical wall and a bottom wall partially defining a runner passageway, each of said runner bottom walls being provided with a plurality of longitudinally spaced outlet ports therein each of which provides air communication between the runner passageway and a respective cylinder of a respective bank, each of said runner vertical walls having an enlarged opening therethrough registering with a respective transversely spaced open end of said body for providing air communication between each of said runner passageways and said air-receiving and pressure wave plenum chambers.

9. An air induction system for a piston engine of the V-type having two longitudinally extending, angularly oriented banks of cylinders, comprising, a generally H-shaped air intake manifold including a hollow body spaced transversely substantially midway between the upper ends of said banks, said body being substantially rectangularly shaped in plan and having upper and lower walls vertically spaced and parallel with respect to each other, the transversely spaced ends of said body being open, a substantially horizontally disposed partition in said body vertically spaced between said body upper and lower walls dividing the space enclosed by said body into an upper air-receiving plenum chamber and a lower pressure wave plenum chamber, an air inlet in said body upper wall, and a pair of longitudinally extending transversely spaced and parallel runners integrally formed with said body, each of said runners having a substantially vertical wall and a lower wall partially defining a runner passageway, each of said runner lower walls being provided with a plurality of longitudinally spaced outlet ports therein, each of which provides air communication between the runner passageway and a respective cylinder of a respective bank, each of said runner vertical walls having an enlarged opening therethrough registering with a respective transversely spaced open end of said body for providing air communication between each of said runner passageways and said air-receiving and pressure wave plenum chambers, each of the transversely spaced edges of the body lower wall merging into the lower wall of a respective runner and said partition having a transverse dimension substantially equal to the transverse spacing between said runner vertical walls.

References Cited in the file of this patent
UNITED STATES PATENTS

| | | |
|---|---|---|
| 873,372 | Hollister | Dec. 10, 1907 |
| 1,201,731 | Hinkley | Oct. 17, 1916 |
| 1,579,688 | Bliffert | Apr. 6, 1926 |
| 1,623,388 | Burtnett | Apr. 5, 1927 |
| 1,632,880 | Burtnett | June 21, 1927 |
| 1,774,632 | Brockway | Sept. 2, 1930 |
| 1,980,778 | Bachle | Nov. 13, 1934 |
| 2,915,049 | Armstrong | Dec. 1, 1959 |
| 2,916,027 | Chayne et al. | Dec. 8, 1959 |
| 2,991,778 | Kolbe et al. | July 11, 1961 |